United States Patent

Warmbier et al.

[11] 4,236,102
[45] Nov. 25, 1980

[54] CONTROL SYSTEM FOR SPOOL DRIVE OF MAGNETIC TAPE APPARATUS

[76] Inventors: Dieter-Ernst Warmbier, Saalburgstr. 85a, 6380 Bad Homburg; Gerhard Biedenkapp, Saalburgstr. 28, 6382 Friedrichsdorf, both of Fed. Rep. of Germany

[21] Appl. No.: 927,916

[22] Filed: Jul. 25, 1978

[51] Int. Cl.³ .............................................. H02P 5/16
[52] U.S. Cl. .................................. 318/341; 318/317; 318/329; 318/503
[58] Field of Search ............... 318/327, 341, 317, 329, 318/503; 323/22 T

[56] References Cited

U.S. PATENT DOCUMENTS

| 3,178,633 | 4/1965 | Slusher et al. | 323/22 T |
|---|---|---|---|
| 3,510,756 | 5/1970 | Chute | 323/22 T |
| 3,596,162 | 7/1971 | Takayama | 318/327 |
| 3,629,677 | 12/1971 | Means | 318/341 |
| 3,701,004 | 10/1972 | Tuccinardi et al. | 323/22 T |
| 3,748,559 | 7/1973 | Steinmann | 318/341 |
| 3,812,410 | 5/1974 | Schaub et al. | 318/341 |
| 3,878,446 | 4/1975 | Brandt | 318/317 |
| 3,934,269 | 1/1976 | Fujita et al. | 318/327 |
| 3,970,909 | 7/1976 | Minakuchi | 318/327 |

*Primary Examiner*—David Smith, Jr.
*Attorney, Agent, or Firm*—Lane, Aitken, Ziems, Kice and Kananen

[57] ABSTRACT

A control system for a magnetic tape apparatus having two spool carriers driven by D.C. drive motors to control the current in one of the motors in order to maintain a uniform tape transport speed comprises a pulse generator driven by the tape, a comparator which compares the timing of the pulses from the generator with a standard and generates a pulse-width modulated output, a transistor switch amplifier, a low-pass filter converting the amplified pulse-width modulated signal to a control voltage, and a direct voltage amplifier supplying a current to the drive motor controlled by the control voltage.

4 Claims, 1 Drawing Figure

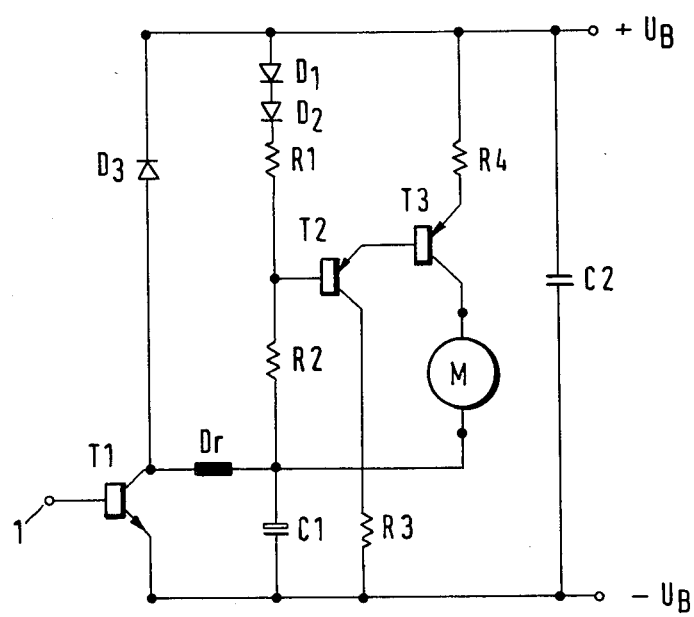

CONTROL SYSTEM FOR SPOOL DRIVE OF MAGNETIC TAPE APPARATUS

The invention concerns a control system for the spool drive of magnetic tape apparatus, in which a D.C. drive motor is provided for each spool carrier and the running speed of the band-shaped record carrier is held at a selected constant value by control of one of the motors, wherein a roller driven by the record carrier drives a rotary pulse generator which supplies pulses proportional to the speed of the tape, whose separation in time provides the actual value necessary for the control function which is compared with a desired value in a comparison circuit, wherein the output signal of the comparison circuit is supplied to a control circuit which controls the winding motors in the required manner.

Such a spool drive system is known from German patent Specification 1,231,452. In this drive system for determination of the feed velocity of the tape there is arranged at a position along the path of the tape a direct current generator of which the generated voltage proportional to the tape speed is so fed back to the direct current drive motor, that taking into account the diameter of the take-up spool the rotary speed of the drive motor directly connected with the tape-up spool is held constant. The voltage generated by the direct current generator is subtracted from the base-emitter voltage of a transistor, whose collector current flows as a controlled supply current through the drive motor for the take-up spool. A particular embodiment of the known tape drive consists in that the tape speed is converted into an alternating voltage of determined frequency and this is supplied together with the standard frequency of a specially provided low frequency oscillator to a frequency discriminator, and that the speed of the drive motor is controlled in accordance with the phase difference.

It is especially disadvantageous in the tape drive system of the known type that in the control a relatively high power loss arises, which is transformed into heat, and that through relatively high heat production the operating characteristics of the apparatus suffer.

It is therefore the object of the invention to provide a control system for the spool drive of a magnetic tape apparatus which makes possible a very precise uniformity of the tape speed, wherein the control system possesses the smallest possible power losses and a correspondingly small heat generation.

This object is achieved in accordance with the invention in that the comparison circuit produces a pulse width modulated output signal corresponding to the deviation of the actual value from the desired value, which is amplified by a switch amplifier and is transformed by a following low pass filter into a direct voltage proportional to the difference of the actual and desired values which controls a direct voltage amplifier serving as a controllable current source and sets the magnitude of the current flowing through the drive motor independently of the instantaneous position of the rotor of the drive motor.

The production by the comparison circuit of a pulse width modulated signal corresponding to the deviation of the actual value from the desired value makes it possible to produce, by means of a switch amplifier and a following low pass filter, a direct voltage signal proportional to the difference between the desired and the actual values. Since there is used as switch amplifier an active element which is either fully switched on and then has a negligibly small resistance or is completely closed and then conducts a negligible current, the power loss in such a suitably constructed switch amplifier is negligibly small. Since moreover the amplified pulse width modulated signal available at the output of the switch amplifier is transformed in a following low pass filter into a correspondingly proportional direct voltage signal, the production of the direct voltage signal is essentially loss free, insofar as the components of the low pass filter are loss-free. In accordance with the invention therefore a source of loss is eliminated which in the known longitudinal control lowers the efficiency of the circuit and produces additional heat. Since in the system in accordance with the invention the current is impressed on the drive motor and is independent of the instantaneous rotor position of the drive motor, on the one hand variations in the speed of rotation of the rotary pulse generator effect through alteration of the motor current a matching of the speed of rotation of the drive motor but on the other hand the resistance to winding in the direct current take up motor varying during the rotation of the take-up spool produces no variation in speed of rotation, so that in this way also the uniformity of the tape speed is increased. On account of the very exact constant value control of the speed of rotation, low induction iron-free direct current motors can be used as drive motors, whereby the heat production is additionally reduced and the costs of manufacture made smaller.

According to a preferred embodiment of the invention the switch amplifier contains at least one active element which is switchable by the pulse-width modulated output signal of the comparison circuit to and fro between a first, current-conducting state with very small resistance and a second current-blocking condition with very high resistance. Preferably the switchable active element of the switch amplifier consists of a transistor, to whose base terminal the pulse-width modulated signal is applied, and to whose collector-emitter path the low-pass filter lies parallel, the emitter of the transistor being connected to a first terminal of a supply source, and this low-pass filter is preferably composed of an inductance coil connected with the collector terminal and a capacitor connected with the emitter.

The direct voltage amplifier of the control circuit, serving as a controllable current source, includes, in the preferred embodiment of the invention, an input transistor whose base is connected by way of a resistance path to the second pole of the supply source and by way of a second resistor to the output of the low-pass filter. The emitter transistor is connected to the base terminal of a further output transistor, the emitter of the output transistor is connected by way of an emitter resistor to the second pole of the supply source, while the drive motor to be controlled is connected between the collector of the output transistor and the output of the low-pass filter.

The resistance path between the base of the input transistor and the second pole of the supply source consists of a series connection of a constant resistor and first and second diodes each poled for conduction which are provided for temperature compensation of the base-emitter circuits of the input and output transistors, and will further reduce the disturbing effect of heating. The collector of the transistor of the switch amplifier is connected by a third diode, poled in the closed direction, to the second pole of the supply source, while in parallel with the supply source there is a guard capacitor.

The frequency of the pulse-width modulated signals is preferably chosen to lie above the level of audibility, that is above 16 KHZ.

In accordance with the invention the capacitor of the low pass filter has a value such that the current flowing through the output transistor of the direct voltage amplifier and the drive motor during the closed time of the transistor of the switch amplifier can flow from the capacitor without production of a large current ripple.

According to the preferred embodiment of the invention a preloading start circuit is provided which to avoid overswing of the control upon run-up of magnetic tape supplies a predetermined pulse sequence as applied signal to the input of the input circuit. The pre-loading start circuit comprises an accurate reference pulse-oscillator and a phase discriminator which compares the phase of the pulse-width modulated applied signals with the phase of the predetermined pulse sequence and switches itself out when the pulse difference between the two signals exceeds a predetermined value.

The invention will be further described in the following with reference to the single FIGURE of the accompanying drawing, which is a circuit diagram for a preferred embodiment of the control circuit of the invention.

DESCRIPTION OF THE PREFERRED EMBODIMENT

The control circuit has a switch amplifier T1, which consists of a transistor whose base terminal forms the input 1 of the control circuit and whose emitter is connected with a first terminal $-U_B$ of a supply source $-U_{B'}+U_B$. Parallel to the collector-emitter path of the transistor T1 of the switch amplifier lies the low pass filter whose induction coil Dr is connected with the collector terminal and whose capacitor C1 is connected with the emitter terminal. To the output of the low pass filter is connected through a resistor R2 the base terminal of a transistor T2 of a direct voltage amplifier, the base of the transistor T2 being connected by way of a further series connection of a resistor R1 and first and second forwardly poled diodes D1,D2 to the second terminal $+U_B$ of the supply source. The collector of the input transistor T2 is connected by way of a collector resistor R3 to the first pole $-U_B$ of the supply source, while the emitter of the input transistor is connected with the base terminal of an output transistor T3 to form a Darlington circuit. The emitter of the output transistor T3 is connected by way of an emitter resistor R4 to the second pole $+U_B$ of the supply source, while the collector terminal of the output transistor T3 is connected with the drive motor M of the magnetic tape apparatus which is to be controlled, the other terminal of the drive motor M being connected with the output of the low-pass filter Dr, C1 at the junction of the induction coil Dr and the capacitor C1. The collector of the transistor T1 is also connected by way of a reverse-poled diode D3 to the second terminal $+U_B$ of the supply source. Parallel to the supply source there is also provided a suppressor capacitor C2.

The manner of operation of the circuit is as follows:

A roller rotated by the record carrier, the magnetic tape, drives a rotary pulse generator, which delivers pulses proportional to the speed of the tape whose separation in time supplies the actual value required for the control function. In a comparison circuit the actual value is compared with a required value, and the comparison circuit delivers a pulse-width modulated output signal which is produced according to the deviation of the actual value from the required value. The pulse-width modulated output signal has preferably a frequency outside the audible range, that is to say above 16 KHz and is supplied to the switch amplifier T1 which amplifies the pulse-width modulated signal and supplies it to a following low-pass filter Dr, C1. The output signal of the following low-pass filter has the form of a direct voltage with very small ripple, whose magnitude is proportional to the difference between actual and required values. Since the transistor T1 of the switch amplifier is either completely open or completely closed, no power losses are produced there. Similarly the conversion of the amplified pulse-width modulated output signals of the transistor T1 into a corresponding direct voltage signal at the output of the low-pass filter is loss-free, insofar as the components of the low-pass filter Dr, C1 are loss-free. The direct voltage signal at the output of the low-pass filter controls the direct voltage amplifier serving as a controllable current source which in the embodiment shown in the drawing is constructed from the transistor T2, T3, the resistors R1, R2, R3, R4 and the diodes D1, D2 and delivers to the drive motor M to be controlled an essentially impressed current. In place of the direct voltage amplifier shown in the drawing other suitable controllable current sources may be used which on the input side are controllable by the direct voltage delivered at the output of the low-pass filter and which themselves supply a correspondingly controlled current to the drive motor M.

The current supplied by the controllable current source, the direct voltage amplifier, flows through the drive motor M during the open time periods of the transistor T1 of the switch amplifier by way of this transistor, while in the closed time periods of the switch transistor T1 it flows through the capacitor C1 of the low-pass filter. In order to ensure that the motor current through this constantly changing current path and through the drawing of current from the capacitor C1 does not acquire any undesirable ripple, the capacitor C1 of the low pass filter has to be made correspondingly large. The motor current, for example, amounts to about 1 Amp. and the duration of the switch period lies round about 25 micro-seconds, then with a voltage of for example about 0.1 Volt at the capacitor, a capacitor of the magnitude of around 250 Microfarads should be chosen if the ripple of the current is not to exceed the permitted limits.

The diodes D1 and D2 serve for compensation of the base-emitter voltages of the transistors T2 and T3 of the direct voltage amplifier, these diodes being in particular so chosen that they follow the temperature characteristic of the base-emitter paths of the two transistors and thereby eliminate thermal influences.

In the control circuit in accordance with the invention which has been described the potential $+U_B$ of the second pole of the supply source is positive, while the potential $-U_B$ of the first pole of the supply source is negative. The transistor T1 of the switch amplifier consists of an NPN- transistor, while the transistors T2 and T3 of the direct voltage amplifier are formed as PNP transistors.

We claim:

1. In a control system for the tape drive in magnetic tape apparatus, in which a d.c. drive motor is provided for each of the two spool carriers and the running speed of the band-shaped record carrier is held at a selected constant value by control of one of the motors, wherein a roller entrained by the record carrier drives a rotary pulse generator which delivers pulses proportional to the tape speed, whose separation in time supplies the necessary actual value for the control, which is compared in a comparison circuit with a desired value, and the output signal of the comparison circuit is supplied to a control circuit, which controls the winding motors in the desired manner, the improvement comprising a comparison circuit which gives a pulse width modulated output signal corresponding to the departures of the actual value from the desired value, a switch amplifier arranged to amplify the output signal from the comparison circuit, a low pass filter following the switch amplifier to convert the amplified output signal into a direct voltage proportional to the difference between the actual and desired values which direct voltage on the one side is serving as supply voltage for the drive motor and which on the other side is controlling a direct voltage amplifier serving as controllable current source to determine the magnitude of the current flowing through the drive motor independent of the instanteous rotor position of the drive motor, the direct voltage amplifier including an input transistor having a base connected through a resistance chain to a terminal of a supply source and through a second resistance to the output of the low pass filter and an output transistor connected after the input transistor in a Darlington circuit, the emitter of the output transistor connected through an emitter resistor to the same terminal of the supply source as the base of the input transistor and the controllable drive motor connected between the collector of the output transistor and the output of the low pass filter.

2. A control system as claimed in claim 1 in which the collector of the input transistors is connected through a collector resistor to the other terminal of the supply source.

3. A control system as claimed in claim 2 in which the collector of the transistor of the switch amplifier is connected to the second pole of the supply source by way of a diode poled in the closed direction.

4. A control system as claimed in claim 1 in which the low pass filter comprises an induction coil and a capacitor of such value that the current flowing through the output transistor and the motor in the closed condition of the transistor of the switch amplifier flows through the capacitor without the production of a large ripple current.

* * * * *